United States Patent
Triplett

(10) Patent No.: US 7,950,576 B2
(45) Date of Patent: May 31, 2011

(54) PORTABLE CONSUMER DEVICE FOR USE IN CURRENCY CONVERSION PROCESS

(75) Inventor: Brian Triplett, El Dorado Hills, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 12/565,637

(22) Filed: Sep. 23, 2009

(65) Prior Publication Data

US 2010/0224681 A1      Sep. 9, 2010

Related U.S. Application Data

(60) Provisional application No. 61/158,603, filed on Mar. 9, 2009.

(51) Int. Cl.
  G06K 5/00    (2006.01)
  G06K 15/00   (2006.01)
  G07F 19/00   (2006.01)
  G06Q 20/00   (2006.01)
  G06Q 40/00   (2006.01)

(52) U.S. Cl. ........ 235/380; 235/375; 235/379; 235/382; 705/35; 705/39; 705/41; 705/44; 705/17

(58) Field of Classification Search .......... 235/375, 235/379, 380, 382; 705/16–18, 26–28, 39–44
See application file for complete search history.

(56) References Cited

U.S. PATENT DOCUMENTS

| 7,783,539 B2 * | 8/2010 | Martin ............... 705/35 |
| 2007/0214054 A1 | 9/2007 | Cleary et al. |
| 2010/0049653 A1 * | 2/2010 | Grotto ............... 705/41 |

FOREIGN PATENT DOCUMENTS

| JP | 2006-344189 A | 12/2006 |
| KR | 10-2006-0098217 A | 9/2006 |
| KR | 10-2007-011963 A | 1/2007 |

* cited by examiner

*Primary Examiner* — Daniel A Hess
*Assistant Examiner* — Laura Gudorf
(74) *Attorney, Agent, or Firm* — Kilpatrick Townsend & Stockton LLP

(57) ABSTRACT

A server computer including a processor and a computer readable medium coupled to the processor. The computer readable medium includes code executable by the processor. The code includes code for determining a load value loaded on a portable consumer device in a first currency and code for converting at least a portion of the load value to a second currency using an exchange rate associated with the first currency and the second currency, where the exchange rate is associated with a set date. The set date may be a current or future date.

20 Claims, 6 Drawing Sheets

---

Account Information

Balance: $1000.00
Currency: U.S. Dollars (USD)       } 40(a)-1

Do you want to convert funds to currency of another country (Y/N)?    Y
How much?    $1000.00
What Country?    Canada
What date do you want to convert the funds (MM/DD/YY)?    10/10/08
} 40(a)-2

[ Convert Currency ]   ← 40(a)-3

40(a)'

Account Information

Balance: $1000.00
Currency: U.S. Dollars (USD)   } 40(a)-1

Do you want to convert funds to currency of another country (Y/N)?   Y
How much?   $1000.00
What Country?   Canada
What date do you want to convert the funds (MM/DD/YY)?   10/10/08   } 40(a)-2

[ Convert Currency ]   ← 40(a)-3

Account Information

Balance: $1223.33
Currency: Canadian Dollars (CAD)   } 40(a)-4

Conversion used Foreign Exchange Rate of
1 USD = 1.22331 CAD that applied on 10/10/08   } 40(a)-5

PORTABLE CONSUMER DEVICE FOR USE IN CURRENCY CONVERSION PROCESS

This application claims the benefit of and is a non-provisional of U.S. Provisional Application No. 61/158,603, filed on Mar. 9, 2009, which is herein incorporated by reference in its entirety for all purposes.

BACKGROUND

It is well known that the value of currencies fluctuate. Currency fluctuations are problematic, since the cost of goods and services for foreign consumers can vary depending upon the current currency exchange rates. For example, a consumer in the United States may plan a trip to Germany months in advance, and may budget for that trip months in advance. There is a chance that a sharp decrease in value of the dollar relative to the Euro, between the time that the trip was planned and the time that the trip is taken, can cause the consumer to exceed his expected budget for the trip.

To avoid the problem of currency fluctuations, the consumer could go to his bank and buy Euros when he plans his trip. However, this is difficult to do and requires that the consumer have cash in his possession for an extended period of time. Also, holding too much cash can be undesirable, since it is cumbersome and is subject to theft.

Embodiments of the invention address these and other problems.

SUMMARY

Systems and methods for currency conversion on a prepaid portable consumer device are disclosed.

One embodiment is directed to a server computer comprising a processor and a computer readable medium coupled to the processor. The computer readable medium comprises code executable by the processor. The code may include code for determining a load value loaded on a portable consumer device in a first currency and code for converting at least a portion of the load value to a second currency using an exchange rate associated with the first currency and the second currency. The exchange rate is associated with a set date. The set date may be the current date or a date in the future.

Another embodiment is directed to a method comprising determining, by a processor, a load value loaded on a portable consumer device in a first currency. The method further comprises converting, by the processor, at least a portion of the load value to a second currency using an exchange rate associated with the first currency and the second currency, wherein the exchange rate is associated with a set date.

Another embodiment is directed to a method comprising obtaining a loadable portable consumer device. The method further comprises initiating converting by a processor at least a portion of a load value from a first currency to a second currency using an exchange rate, wherein the exchange rate is associated with a set date.

These and other embodiments of the invention are described in further detail below.

BRIEF DESCRIPTION OF THE DRAWINGS

FIGS. 4A and 4B show two exemplary displays that may be present on a client computer during the process of converting a load value on a loadable portable consumer device to a new currency.

DETAILED DESCRIPTION

Figure 1:
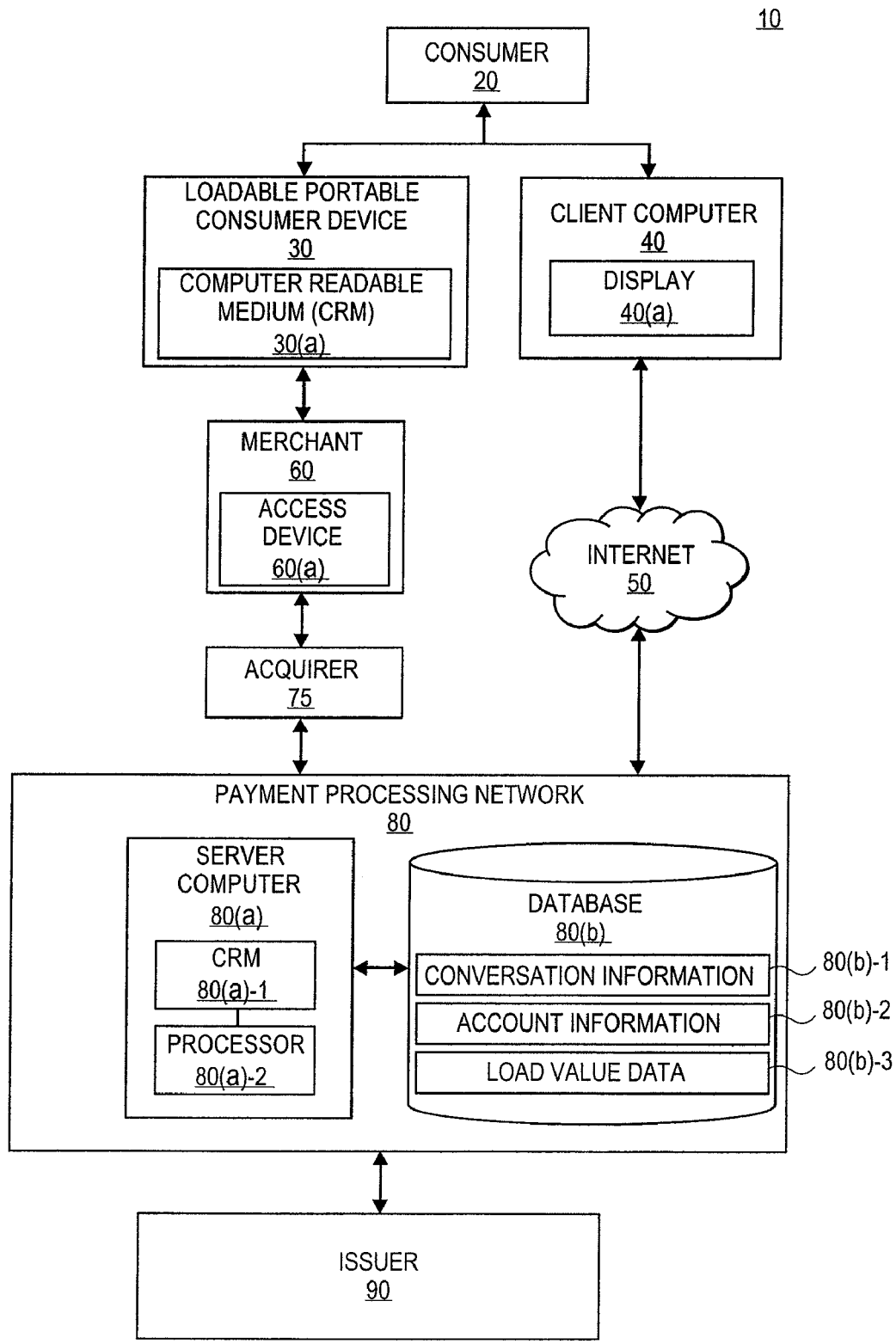
FIG. 1 is a block diagram of an exemplary system according to an embodiment of the invention.

Embodiments of the invention are directed to methods and systems for converting load values of loadable portable consumer devices (e.g., prepaid cards) in a home currency (e.g., the U.S. Dollar) to other foreign currencies (e.g., the Euro, Won, etc.).

In a typical process of obtaining a prepaid card, a consumer can provide tender (e.g., cash, bank or cashier check, withdrawal from bank account, etc.) to an issuer (e.g., a bank) to obtain the loadable prepaid card (or other portable consumer device). The issuer opens an account and loads the loadable prepaid card with a load value equal to the value of the tender (minus any applicable fees). The load value is in the home currency of the country in which the consumer resides. For example, the consumer may reside in the United States and the load value may be 1000 U.S. Dollars. Once loaded, the issuer provides the loaded prepaid card to the consumer.

To convert the home currency on the consumer's prepaid card to a foreign currency such as the Euro, the consumer can contact the issuer or a payment processing organization (e.g., Visa) that works with the issuer. For example, in one embodiment, the consumer can access his account information on a Web site provided by a server computer operated by a payment processing organization. Using the Web site, the consumer initiates conversion by requesting that the value on the prepaid card be converted to a new currency immediately, or on a specified date in the future. On the date selected by the consumer, the server computer determines the applicable exchange rate and converts the load value on the prepaid card to a new value in the new currency using the exchange rate for the new currency. The server computer can also send a message indicating the new load value in the new currency to the issuer. If desired, and as will be explained in further detail below, the consumer may also convert the load value of the loadable prepaid card to any number of additional currencies.

After the load value is converted to the new currency, the consumer can use the prepaid card to purchase products/services at a merchant located in a country that uses the new currency. In a typical transaction, an access device at the merchant may send an authorization request message with the transaction amount in the new currency to the server computer of the payment processing network. The server computer of the payment processing network forwards the authorization request message to the issuer with the transaction information including the transaction amount in the new currency. The issuer may then determine if there are sufficient funds, in the new currency, in the consumer's prepaid card account. If there are sufficient funds, then the consumer may send an authorization response message back to the merchant indicating that the transaction is approved by the issuer. If there are insufficient funds, or if there are other circumstances suggesting that the transaction should be declined (e.g., fraud), then the issuer may send an authorization response message back to the merchant indicating that the transaction is not approved.

Embodiments of the invention have a number of advantages. One advantage to consumers is that embodiments of the invention provide consumers with control over the exchange rate on their prepaid portable consumer devices (e.g., prepaid cards). A consumer is able to plan a trip or other expense far in advance without worrying about currency fluctuation implications.

I. Exemplary Systems

FIG. 1 is a block diagram of an exemplary system 10 for currency conversion of a load value on a loadable portable consumer device 30. The system 10 includes a consumer 20, a loadable portable consumer device 30 having a computer readable medium (CRM) 30(*a*), and a merchant 60 having an access device 60(*a*). The consumer 20 can use the loadable portable consumer device 30 to initiate a transaction with a merchant 60 using the merchant's access device 60(*a*). The merchant 60 may have an acquirer 70 associated with it.

System 10 also includes a payment processing network 80 having a server computer 80(*a*) and a database 80(*b*) in communication with server computer 80(*a*). The server computer 80(*a*) comprises a computer readable medium (CRM) 80(*a*)-1 and a processor 80(*a*)-2 in communication with the computer readable medium 80(*a*)-1. The processor 80(*a*)-2 executes code stored on CRM 80(*a*)-1 for performing the functions of server computer 80(*a*). The database 80(*b*) includes conversion information 80(*b*)-1, account information 80(*b*)-2, load value data 80(*b*)-3, and other suitable information.

System 10 also includes a client computer 40 having a display 40(*a*) for providing information such as account information to the consumer 20. The Internet 50 is in communication with the client computer 40 and the payment processing network 80. The consumer 20 can use the client computer 40 to communicate with the server computer 80(*a*) to convert the currency of the funds loaded on the portable consumer device 30.

System 10 also includes an issuer 90, which maintains an account associated with the loadable portable consumer device 30. The issuer 90 is in communication with payment processing network 80, and can load funds into the account associated with loadable portable consumer device 30. Although system 10 includes one consumer, one loadable portable consumer device 30, one client computer 40, one merchant, one acquirer 70, and one issuer 90, any suitable number of these entities may be included in system 10.

As used herein, "loading" includes loading and/or reloading value onto loadable portable consumer devices 30. Loading of a value can be done by crediting the account associated with the loadable portable consumer device 30 with the value. A load value refers to the value or balance on the account associated with the loadable portable consumer device 30. The load value is initially associated with a home currency. A "home currency" can be the currency of the country in which the consumer 20 resides.

When a value is loaded onto the loadable portable consumer device 30, the load value is updated to add the value. For example, if the current load value is $10 on a loadable portable consumer device 30 and the consumer loads an additional value of $20 onto the loadable portable consumer device 30, the new load value is $30. Any suitable entity can load value onto the loadable portable consumer device 30. For example, the issuer 90, the merchant 60, or the payment processing network 80 can load value onto loadable portable consumer device 30 (e.g., a prepaid card) for the consumer 20.

A loadable portable consumer device 30 can refer to any device capable of being loaded with a value (i.e. a load value). Loadable portable consumer device 30 can be in any suitable form such as hand-held and compact so that it can fit into a consumer's wallet and/or pocket (e.g., pocket-sized). Some examples of suitable devices include prepaid cards and stored value cards. Some examples of these cards include gift cards, payroll cards, flexible spending account cards, government benefit cards (such as food stamps), insurance claim cards, employee reward cards, travel cards, remittance payment cards, and transportation cards. Some other examples of loadable portable consumer devices 30 may include cellular phones, personal digital assistants (PDAs), fobs, pagers, smart media, transponders, and the like.

The loadable portable consumer device 30 may use any suitable mechanism for interfacing with the access device 60(*a*) and other devices. Suitable mechanisms include, for example, any suitable electrical, magnetic, or optical interfacing system such as a contactless system.

The merchant 60 can be any suitable entity. Some examples of merchants 60 include a department store, a gas station, a drug store, a grocery store, or other suitable business.

The access device 60(*a*) can be any suitable device that can interact with the loadable portable consumer device 30. Examples of suitable access devices 60(*a*) include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. Access device 60(*a*) may use any suitable contact or contactless mode of operation to communicate data to and from loadable portable consumer device 30.

Access device 60(*a*) can have a computer readable medium (CRM) and a processor coupled to the computer readable medium for performing the functions of the access device 60(*a*). Computer readable medium may be a memory that stores data and may be in any suitable form. A suitable computer readable medium comprises code having instructions for performing the functions of the access device 60(*a*). For example, a suitable computer readable medium may include code for sending transaction information and account information to the payment processing network 80.

The acquirer 70 can be any entity capable of having an account with the merchant 60. For example, the acquirer 70 may be a bank that operates a bank account for the merchant 60.

The payment processing network 80 may include data processing subsystems, networks, currency conversion services, authorization services, and clearing and settlement services. An exemplary payment processing network 60 may include VisaNet™. Payment processing networks such as VisaNet™ are able to process credit card transactions, debit card transactions, prepaid card transactions, stored-value card transactions, and other types of commercial transactions. VisaNet™, in particular, includes a VIP system (Visa Integrated Payments system) which processes authorization requests and a Base II system which performs clearing and settlement services.

The payment processing network 60 comprises any suitable components for running its data processing subsystems. In FIG. 1, the payment processing network 60 includes a server computer 80(*a*) and a database 80(*b*). The server computer 80(*a*) is typically a powerful computer or cluster of computers. For example, server computer 80(*a*) can be a large mainframe, a minicomputer cluster, or a group of servers functioning as a unit. In one example, server computer 80(*a*) may be a database server coupled to a Web server.

The server computer 80(*a*) includes a computer readable medium (CRM) 80(*a*)-1 comprising code having instructions for performing the functions of the server computer 80(*a*). For example, CRM 80(*a*)-1 may include code for communicating (e.g., receiving and sending) messages and information such as transaction information, conversion information 80(*b*)-1, account information 80(*b*)-2, and load value data 80(*b*)-3. It may also have code for operating a Web site, code for determining applicable exchange rates, code for converting a load value in a home currency to a new currency using the determined applicable exchange rate, code for storing/retrieving information to/from database 80(*b*), code for sending an authorization request message to the issuer 90, code for receiving an authorization response message from the issuer 90, etc. The processor 80(*a*)-2 can execute the code stored on the computer readable medium 80(*a*)-1 to perform the functions of the server computer 80(*a*).

The database 80(*b*) can store any suitable information. In FIG. 1, the database 80(*b*) stores conversion information 80(*b*)-1, account information 80(*b*)-2, and load value data 80(*b*)-3. Alternatively or additionally, some or all of conversion information 80(*b*)-1, account information 80(*b*)-2, and load value data 80(*b*)-3 may be stored on CRM 30(*a*) of loadable portable consumer device 30 and/or a database associated with the issuer 90.

Load value data 80(*b*)-3 includes the load value of the loadable portable consumer device 30. In some case, the load value data 80(*b*)-3 also includes the type of currency associated with the load value. The load value data 80(*b*)-3 may be stored on the database 80(*b*) and/or on a database operated by the issuer 90.

Conversion information 80(*b*)-1 refers to any suitable information related to converting a load value, transaction amount, or other value to another currency loaded on the loadable portable consumer device 30. Some examples of suitable information include set dates, conversion dates, exchange rates, and the names or other identifiers of the new currencies. The exchange rate that applies on the set date is used to convert the load value of the loadable portable consumer device 30 to the new currency. Applicable exchange rates can be provided by the issuer 90 or by another suitable source.

In one embodiment, the consumer 20 selects a current future date to set the exchange rate. For example, the consumer 20 may select a future date of Jan. 1, 2010 as their set date to convert the $100 in U.S. Dollars loaded on his loadable portable consumer device 30 to Euros. In this example, the exchange rate that applies on Jan. 1, 2010 would be used to convert the load value from U.S. Dollars to Euros. The exchange rates stored in conversion information 80(*b*)-1 can include the exchange rates used to convert the load value to different currencies and can include current exchange rates that apply. Current exchange rates may be updated in the database 80(*b*) on any suitable basis such as periodically (e.g., hourly or daily).

Conversion information 80(*b*)-1 also includes conversion triggers provided by the consumer 20. Conversion triggers are used to determine the applicable exchange rate for conversion of the load value on the loadable portable consumer device 30 to a new currency. Conversion triggers may also trigger the conversion of the load value. Some examples of triggers include set dates, minimum exchange rates, predefined percentage increase in exchange rates, and other suitable triggers. For example, the consumer 20 may define a conversion trigger of a minimum exchange rate of 0.80 U.S. Dollars to Euros. After the consumer 20 defines the conversion trigger, the server computer 80(*a*) may periodically check applicable exchange rates. If the applicable exchange rate is equal to or greater than 0.80, the server computer 80(*a*) converts $100 US Dollars on the loadable portable consumer device 30 to Euros using the exchange rate that applies at that time.

Account information 80(*b*)-2 includes any information that is associated with the account associated with loadable portable consumer device 30. Some examples of suitable information include a primary account number (PAN), consumer information such as a name, identifying information of the cardholder if different from the consumer 20, mapping information that links the PAN to the load value data 80(*b*)-3, issuer identification (e.g., a bank identification number (BIN)), etc.

The client computer 40 can include any suitable device capable of allowing the consumer 20 to communicate with the server computer 80(*a*) and the Internet 50. Some suitable devices include a personal computer, a cell phone, a PDA, etc. Client computer 40 includes a display 40(*a*) for communicating the information to consumer 20. Although not shown, client computer 40 also includes a computer readable medium communicating with a processor. The processor executes code stored on the computer readable medium to perform functions of the client computer 40.

The server computer 80(*a*) may operate a Web site. The Web site can be used by the consumer 20 to accomplish a number of functions. The Web site may allow the consumer 20 to view account information 80(*b*)-2, convert the currency of the load value of the loadable portable consumer device 30, change an account identifier, obtain a new loadable portable consumer device 30, load value on a loadable portable consumer device 30, etc. The option of converting the currency of the load value of a loadable portable consumer device 30 may, for example, allow the consumer 20 to enter a conversion request on the Web site using the client computer 40. The conversion request is a request to convert the load value (in the home currency) of loadable portable consumer device 30 to a new currency. The conversion request may include any suitable conversion information such as the desired new currency and the conversion trigger used to determine the exchange rate.

II. Exemplary Methods

Figure 2:
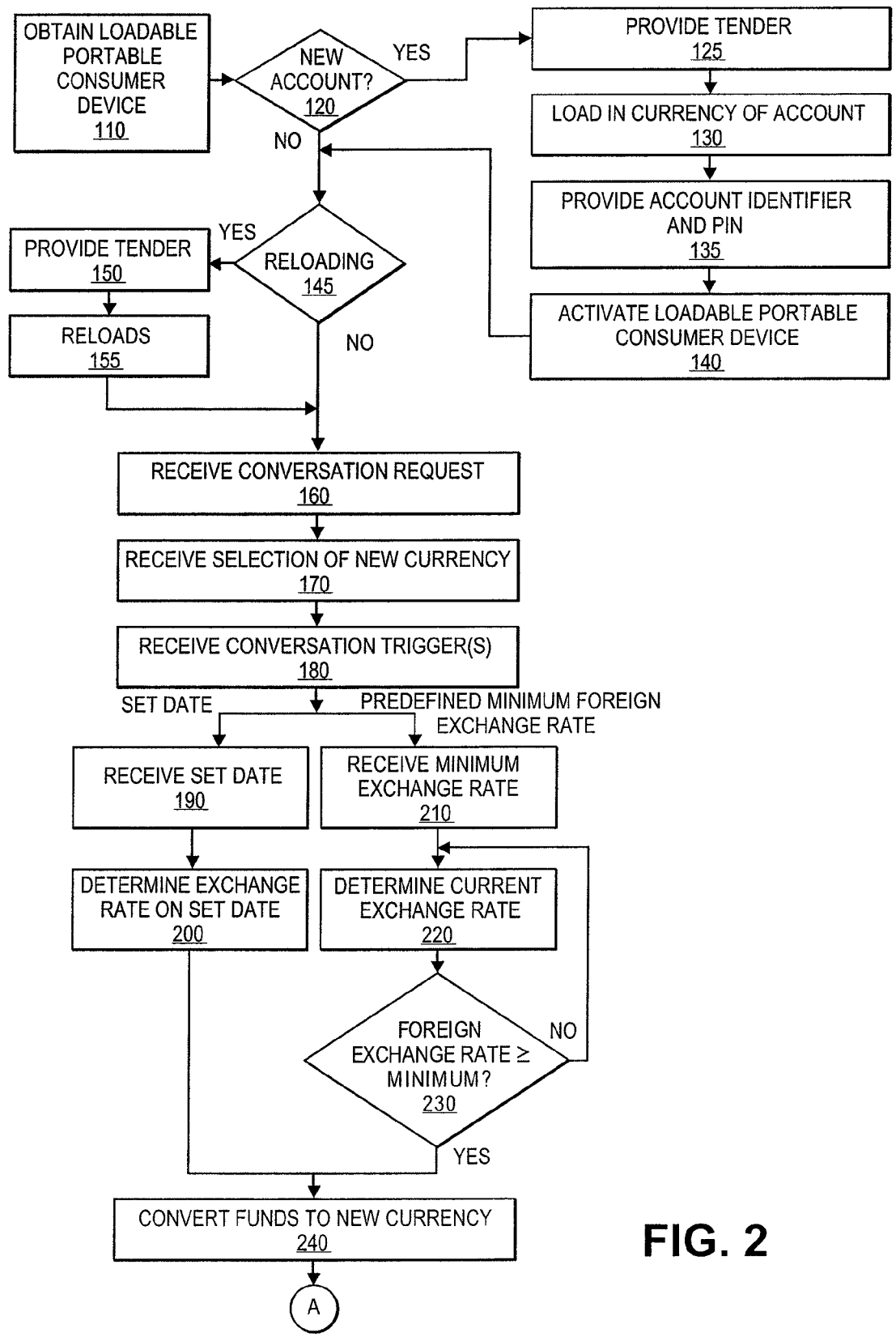
FIGS. 2-3 show a flowchart of an exemplary method for converting a load value of a loadable portable consumer device to a new currency and conducting a transaction in the new currency using the loadable portable consumer device.
Figure 3:
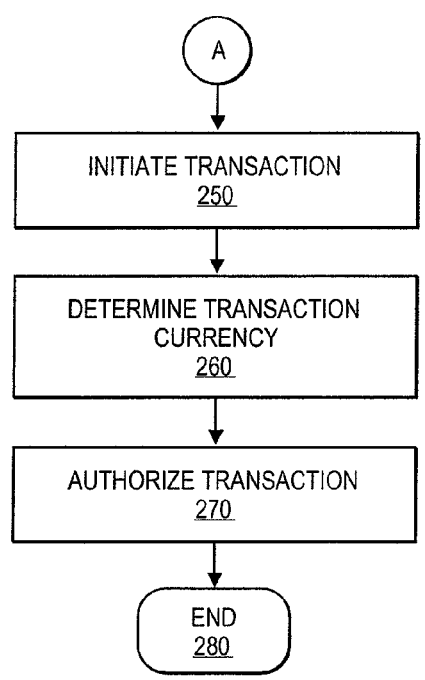

FIGS. 2-3 illustrate a flowchart of an exemplary method for converting a load value of loadable portable consumer device 30 from a home currency to a new currency and conducting a transaction in the new currency using the loadable portable consumer device 30. The method starts with consumer 20 obtaining a loadable portable consumer device 30 (step 110).

If the consumer 20 is obtaining a new loadable portable consumer device 30 associated with a new account (step 120), the consumer 20 provides tender (e.g., cash, bank or cashier check, withdrawal from bank account, etc.) to the issuer 90 to open the new account (step 125). The issuer 90 then opens the new account, loads the new loadable portable consumer device 30 with a load value equal to the value of the tender minus any fees (step 130), and credits the new account with the load value. The load value is stored as load value data 80(*b*)-1 along with account information 80(*b*)-2 in a database on a server computer (not shown) associated with the issuer 90. The issuer 90 may communicate the load value data 80(*b*)-3 along with account information 80(*b*)-2 to payment processing network 80. Server computer 80(*a*) of payment processing network 80 then stores the load value data 80(*b*)-1 along with account information 80(*b*)-2 in database 80(*b*).

The issuer 90 then provides the consumer 20 with an account identifier and a PIN associated with the new account (step 135). The issuer 90 and/or payment processing network 80 may use the account identifier and PIN to authenticate consumer 20. For example, consumer 20 may be required to enter the account identifier and PIN at a login prompt of a Web site hosted by the server computer 80(*a*). The server computer 80(*a*) may then authenticate the consumer 20 using the entered account identifier and PIN before displaying information such as account information 80(*b*)-2 or load value data 80(*b*)-3.

The consumer 20 can then activate the loadable portable consumer device 30 in any suitable manner (step 140). For example, the consumer 20 may call an automated phone service that activates the loadable portable consumer device 30, or may visit an appropriate Web site to activate the portable consumer device 30.

If the consumer 20 obtains a previously issued portable consumer device 30 that is reloadable, the consumer 20 may reload, i.e., add more value to the portable consumer device 30. If the consumer 20 is reloading (step 145), the consumer 20 provides tender (e.g., cash, bank or cashier check, withdrawal from bank account, etc.) to the issuer 90 (step 150), and the value of the portable consumer device 30 (step 155) is adjusted. The issuer 90 can store the new value as load value data in a database that it operates. If desired, the issuer 90 can communicate the load value data 80(*b*)-3 along with account information 80(*b*)-2 to payment processing network 80, where it can be stored in the database 80(*b*).

At some point in time, the consumer 20 may initiate the conversion (by a processor in a server computer) of at least a portion of a load value from a first currency to a second currency using an exchange rate associated with a set date. For example, in some embodiments, the server computer 80(*a*) can receive a conversion request message from the consumer 20 (step 160). For example, the consumer 20 may visit a Web site hosted by the server computer 80(*a*). The consumer 20 may access his account information 80(*b*)-2 after server computer 80(*a*) authenticates consumer 20. The Web site may provide a plurality of options such as viewing account information 80(*b*)-2, converting the home currency of the load value on the loadable portable consumer device to a new currency, etc. In one example, the Web site may provide a Web page with a "Convert Currency" button that allows consumer 20 to select the option of converting a load value on a portable consumer device 30.

Before or after the server computer 80(*a*) receives the conversion request message, it receives a selection of a new currency from the consumer 20 (step 160). Returning to the Web site example, the consumer 20 may enter the selection of a new currency on the Web site. For example, the consumer 20 may be prompted for the name of the country (or association of countries) associated with the new currency (e.g., US, Canada, Europe, etc.). Alternatively, the consumer 20 may be prompted to select the new currency from a list of currencies available for currency conversion.

In one embodiment, the conversion request sent to the server computer 80(*a*) includes the new currency and/or other conversion information 80(*b*)-1. For example, the consumer 20 may provide the new currency and the conversion trigger such as the set date on a Web page. The consumer 20 may select the "Convert Currency" button to send a message with the conversion request to the server computer 80(*a*).

In the exemplary method, the server computer 80(*a*) also receives one or more conversion triggers from the consumer 20 (step 180). If the consumer 20 selects a set date as the conversion trigger, the server computer 80(*a*) receives the set date (step 190) and determines the exchange rate that applies on the set date (step 200). The server computer 80(*a*) may retrieve the exchange rate that applies on the set date from the conversion information 80(*b*)-1 in the database 80(*b*). Alternatively, the server computer 80(*a*) may retrieve or receive the exchange rate on the set date from the issuer 90.

After determining the applicable exchange rate, the server computer 80(*b*) converts the load value to the new currency using the applicable exchange rate on the set date (step 240). The server computer 80(*a*) stores the exchange rate used to convert the load value and the associated set date in the conversion information 80(*b*)-1 in database 80(*b*). The server computer 80(*a*) may also store the new load value as load value data 80(*b*)-3 in database 80(*b*), and may send a conversion message to the issuer 90 with the new load value, the name of the new currency, and the account information. The issuer 90 stores the new load value and new currency in the account information associated with loadable portable consumer device 30.

If the consumer 20 selects a predefined minimum exchange rate as the conversion trigger, the server computer 80(*a*) receives the minimum exchange rate from the consumer 20 (step 210). The server computer 80(*a*) periodically (e.g., by the minute, hourly, or daily) determines the current exchange rate that applies at that time (step 220). For example, the server computer 80(*a*) may periodically retrieve the exchange rates from the conversion information 80(*b*)-1 in the database 80(*b*). The exchange rates stored in the conversion information 80(*b*)-1 of the database 80(*b*) may be updated on any suitable basis. As another example, server computer 80(*a*) may periodically retrieve the exchange rates from the issuer 90.

The server computer 80(*a*) can determine if the current exchange rate is above the minimum exchange rate provided by the consumer 20 (step 230). If the server computer 80(*a*) determines that the current exchange rate is less than the minimum exchange rate provided by the consumer 20, the method returns to determine the current exchange rate (step 220).

If the server computer 80(*a*) determines that the current exchange rate is greater than or equal to the minimum exchange rate provided by the consumer 20 (step 230), then the server computer 80(*a*) converts the load value to the new currency using the current exchange rate (step 240). The server computer 80(*a*) then stores the exchange rate used to convert the load value and the date that the conversion took place in the conversion information 80(*b*)-1 in the database 80(*b*). The server computer 80(*a*) may also store the new load value as load value data 80(*b*)-3 in the database 80(*b*). The server computer 80(*a*) also sends a conversion message to the issuer 90 with the new load value and the name of the new currency along with account information. The issuer 90 may then store the new load value and new currency in the account information associated with loadable portable consumer device 30.

Referring to FIG. 3, once the consumer 20 has informed the server computer 80(*a*) of the desired currency conversion and date thereof, the consumer 20 can initiate a transaction at a merchant 60 (step 250). The consumer 20 may initiate the transaction in any suitable manner. For example, the consumer 20 may be a U.S. resident and may be vacationing in Germany on Jun. 1, 2008. On Jan. 1, 2008, he may have previously loaded his portable consumer device 30 with $1500 and may have converted that $1500 to 1000 Euros (at a conversion rate of 1.5 U.S. dollars per Euro). He may use the loadable portable consumer device 30 to interact with the access device 60(*a*) at a local merchant 60 to initiate a transaction to buy a good worth 10 Euros on Jun. 1, 2008 in Germany. Once the transaction is initiated, the access device 60(*a*) generates an authorization request message including transaction information such as the amount of the transaction in Euros. The authorization request message may include other information including a PAN (primary account number) including a BIN (bank identification number), merchant ID, and other information. Once generated, the access device 60(*a*) sends the authorization request message to the acquirer 75 and then to the payment processing network 80, where it can be received an analyzed by the server computer 80(*a*)-1.

In some embodiments, server computer 80(*a*) in the payment processing network 80 can keep records of the consumer's selected currency conversion date and the exchange rate on that date. Using this information, the server computer 80(*a*) may convert any transaction amounts in the foreign currency using the exchange rate on the date that the consumer decided to select as the currency conversion date.

In these embodiments, the processor 80(*a*)-2 in the server computer 80(*a*), using code on the computer readable medium 80(*a*)-1 and information in the database 80(*b*), may analyze the authorization request message. The processor 80(*a*)-2 may determine that the conversion rate to apply to the transaction is not the current conversion rate of 1.7 U.S. dollars per Euro, but that the conversion rate to apply to the transaction is the conversion rate as of Jan. 1, 2008 (1.5 U.S. Dollars per Euro). The server computer 80(*a*) could then modify the authorization request message to indicate that the amount of the transaction to be charged to the consumer's account is $15 (at a conversion rate of 1.5 U.S. Dollars per Euro, instead of the current conversion rate of 1.7 U.S. dollars per Euro).

The server computer 80(*a*) can then send the authorization request message to the issuer 90 to authorize (or decline) the transaction based on the amount of the transaction (taking into account the appropriate currency conversion). The issuer 90 then authorizes (or declines) the transaction (step 270), based on a number of factors including whether there are sufficient funds in the consumer's account and/or whether the transaction is considered potentially fraudulent. If the transaction is authorized, issuer 90 retrieves the current balance for the consumer's prepaid portable consumer device from its database and calculates a new balance by subtracting the transaction amount from the balance. The issuer 90 then sends an authorization response message back to the merchant 60, via the payment processing network 80 and the acquirer 75, which indicates if the transaction is authorized or not authorized. Any receipt provided to the consumer 20 may have all relevant information regarding the transaction including the amount of the transaction in the foreign currency (e.g., 10 Euros), the applicable conversion rate (e.g., 1.5 U.S. Dollars per Euro), the date, and the merchant ID.

At the end of the day, a clearing and settlement process can take place.

In the above-described embodiment, the payment processing network 80 performs the foreign currency conversion process and stores the information needed to perform the foreign currency conversion process. However, in other embodiments, the issuer 90 or a server computer associated with it may collect the data needed to perform the foreign currency conversion process using the currency conversion rate previously set by the consumer. In this embodiment, the payment processing network 80 could simply act as a pass through for authorization request and response messages and any currency conversion processing and account adjusting can be performed solely by the issuer 90.

In yet other embodiments, the consumer's prepaid card account can simply show that any value therein is held in the foreign currency (e.g., 100 Euros) previously converted. When an authorization request message including the transaction amount (e.g., 5 Euros) in that foreign currency is received by the issuer 90, the issuer 90 may simply debit the account by the transaction amount to create a new balance (e.g., 95 Euros) in the account.

Although the exemplary methods described above convert the value associated with the loadable portable consumer device 30 to a single new currency. It is contemplated that portions of the value may be converted to multiple currencies. In some cases, each of the converted load values associated with the multiple currencies may be associated with a different account identifier (e.g., PAN). For example, consumer 20 may have a prepaid card with $1000 U.S. Dollars and may be travelling to five different countries. Consumer 20 may choose to convert each of five equal portions of $200 U.S. Dollars to the currencies of the five countries. Each of the converted load values may be saved in database 80(*b*) associated with different account identifiers (e.g., PANs) where each account identifier is associated with a different currency.

III. Exemplary Displays

FIGS. 4A and 4B shows two exemplary displays 40(*a*)' that may be present on client computer 40 during the process of converting the load value on a loadable portable consumer device 30 to a new currency.

In FIG. 4A, the display 40(*a*) has information 40(*a*)-1 including the balance (i.e. load value) of the loadable portable consumer device 30 and the currency associated with the balance. In this example, the balance is "$1000" and the currency is "U.S. Dollars (USD)."

The display 40(*a*) of FIG. 4A also includes prompts 40(*a*)-2 for the consumer 20 to enter information. The first prompt 40(*a*)-2 includes the question "Do you want to convert funds to the currency of another country?" In this example, consumer 20 has entered "Y" at the first prompt. After the consumer 20 enters "Y" at the first prompt, the other prompts of "How much?" "What Country?" and "What date do you want to convert the funds (MM/DD/YY)?" and the "Convert Currency" button 40(*a*)-3 are displayed. In this example, consumer 20 initiates a request to convert $1000.00 to the currency of Canada on the set date of Oct. 10, 2008. Selecting the "Convert Currency" button 40(*a*)-3 triggers a conversion request to be sent in a message to server computer 80(*a*). By selecting the "Convert Currency" button 40(*a*)-3, the consumer 20 initiates conversion of $1000 to the currency of Canada. The server computer 80 (or a processor therein executing code on a computer readable medium) determines the exchange rate that applies on the set date of Oct. 10, 2008 and converts the $1000 using the determined exchange rate that applies on the set date.

In FIG. 4B, the display 40(*a*)" that has information 40(*a*)-4 including the balance (i.e., load value) and the currency of the balance of the loadable portable consumer device 30 after the currency has been converted according to the information 40(*a*)-2 in FIG. 4A. In this illustrated example, the new load value is "$1223.33" in the currency of "Canada Dollars (CAD)." The display 40(*a*) also includes additional conversion information 40(*a*)-5 including the foreign exchange rate used in the conversion and the set date. In this example, the server computer 80(*a*) determined that the foreign exchange rate of 1 USD=1.22331 CAD applied on the set date of Oct. 10, 2008.

II. Exemplary Loadable Portable Consumer Devices

Figure 5A:
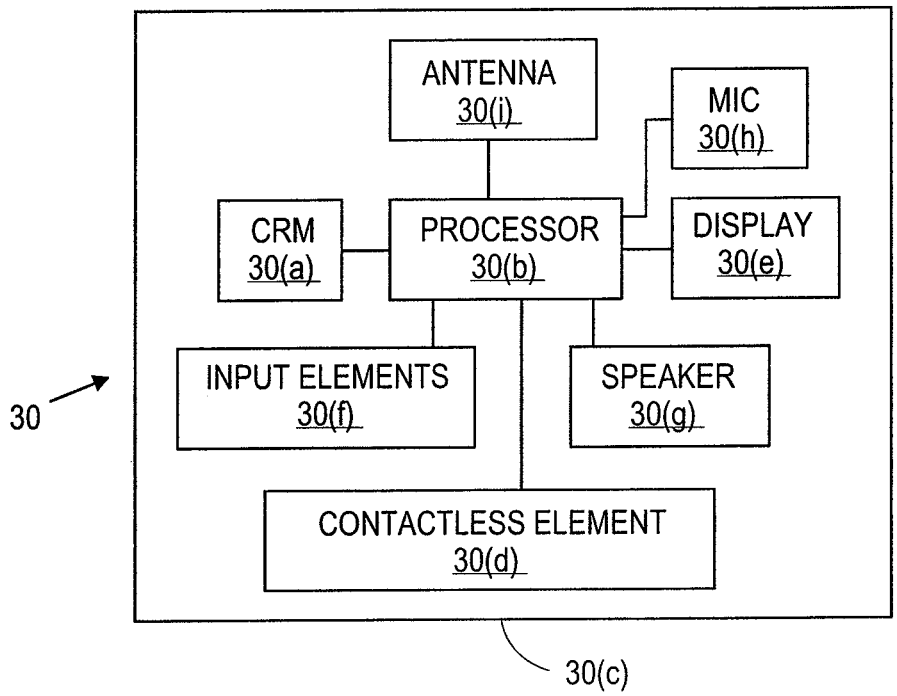
FIG. 5A is a block diagram of components of an exemplary loadable portable consumer device in the form of a mobile phone.

FIG. 5A is a block diagram of components of an exemplary loadable portable consumer device 30 in the form of a mobile phone. This exemplary loadable portable consumer device 30 comprises a body 30(c) that may be in the form a plastic substrate, housing, or other structure.

The exemplary mobile communication device 30 in FIG. 5A also comprises a computer readable medium (CRM) 30(a) that may be present within the body 30(c), or may be detachable from it. CRM 30(a) may be a memory that stores data and may be in any suitable form including a magnetic stripe, a memory chip, etc. The CRM 30(a) can store any suitable information such as portions of account information, transit information (e.g., as in a subway or train pass), access information (e.g., as in access badges), etc. Any of this information may be transmitted by loadable portable consumer device 30.

The exemplary loadable portable consumer device 30 in FIG. 2A also includes a contactless element 30(d), which is typically implemented in the form of a semiconductor chip (or other data storage element) with an associated wireless transfer (e.g., data transmission) element, such as an antenna. The contactless element 30(d) is associated with (e.g., embedded within) the loadable portable consumer device 30 and data or control instructions transmitted via a cellular network may be applied to the contactless element 30(d) by means of a contactless element interface. The contactless element interface functions to permit the exchange of data and/or control instructions between the mobile communication device circuitry (and hence the cellular network) and the contactless element 30(d).

The contactless element 30(d) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the loadable portable consumer device 30 and an interrogation device. Thus, the loadable portable consumer device 30 is capable of communicating and transferring data and/or control instructions via both cellular network and near field communications capability.

The exemplary loadable portable consumer device 30 in FIG. 5A also includes a processor 30(b) (e.g., a microprocessor) for processing the functions of the loadable portable consumer device 30 and a display 30(e) to display information such as messages, and information such as transaction information, phone numbers, account information, and conversion information to viewers such as consumer 20. In the portable consumer device 30, the antenna 30(i) for wireless data transfer (e.g., data transmission), CRM 30(a), contactless element 30(d), display 30(e), input elements 30(f), speaker 30(g), microphone 30(h), and antenna 30(j) are all operatively coupled to processor 30(b).

Figure 5B:
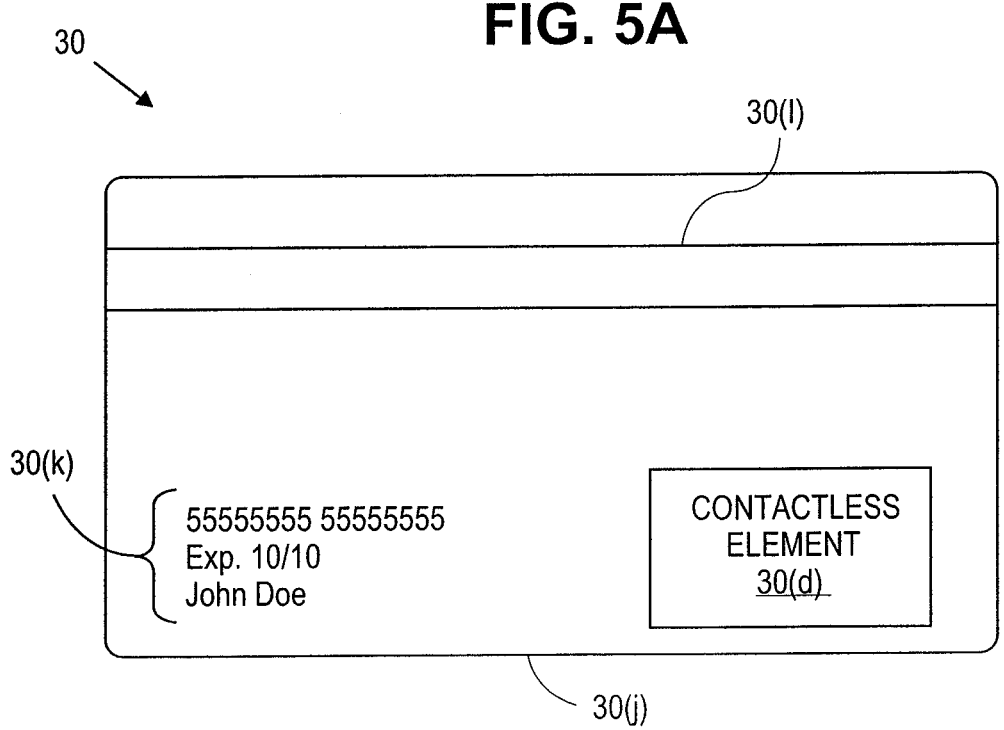
FIG. 5B shows a plan view of an exemplary loadable portable consumer device in the form of a magnetic stripe card.

FIG. 5B shows a plan view of an exemplary loadable portable consumer device 30 in the form of a magnetic stripe card. The exemplary loadable portable consumer device 30 comprises a plastic substrate 30(j) and a contactless element 30(d) for interfacing in a contactless manner with access device 60(a). The contactless element 30(d) may be located on or embedded within the plastic substrate 30(j). The exemplary loadable portable consumer device 30 also has consumer information 30(k) including an account number (e.g., a PAN), the expiration date, and the name of the consumer 20. The consumer information 30(k) may be printed or embossed on the card. The exemplary loadable portable consumer device 30 also includes a magnetic stripe 30(l) for storing information. The magnetic stripe 30(l) may be on the plastic substrate 30(j).

As shown in FIG. 5B, loadable portable consumer device 30 may include both a magnetic stripe 30(l) and a contactless element 30(d). In other embodiments, either the magnetic stripe 30(l) or the contactless element 30(d) may be present in the loadable portable consumer device 30.

V. Computer Apparatuses

Figure 6:
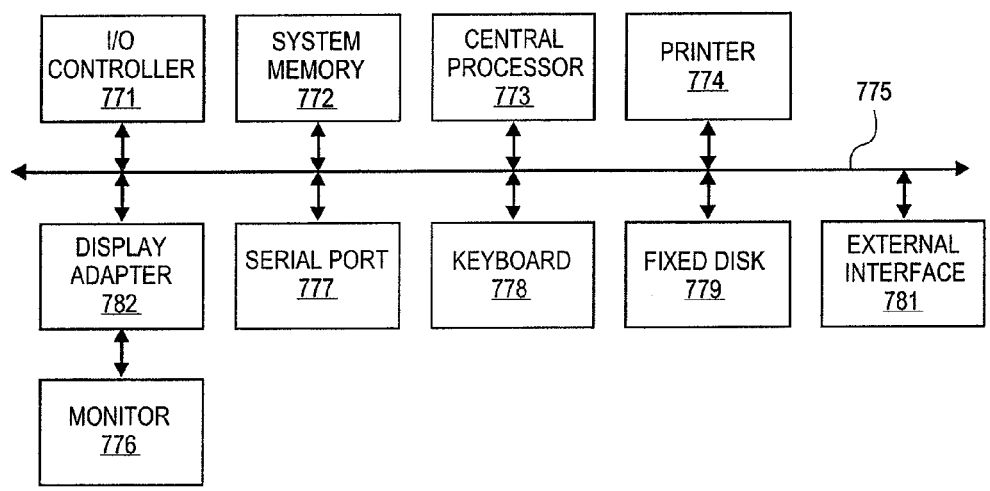
FIG. 6 shows a block diagram of subsystems that may be present in computer apparatuses that are used in system.

FIG. 6 shows a block diagram of subsystems that may be present in computer apparatuses that are used in system 10, according to embodiments of the disclosure. The various participants and elements in the previously described Figures may operate using one or more computer apparatuses to facilitate the functions described herein. Any of the elements in the Figures may use any suitable number of subsystems to facilitate the functions described herein. Examples of such subsystems or components are shown in a FIG. 6.

The subsystems shown in FIG. 6 are interconnected via a system bus 770. Additional subsystems such as a printer 784, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 782 or the fixed disk 779, as well as the exchange of information between subsystems. The system memory 782 and/or the fixed disk 779 may embody a computer readable medium. Any of these elements may be present in the previously described features. For example, the previously described server computer 80(a) may have one or more of these components shown in FIG. 6.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this disclosure, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

Modifications, additions, or omissions may be made to the illustrated embodiments in FIGS. 1-6 without departing from the scope of the disclosure. The features of the illustrated embodiments may be integrated with one or more features of any other embodiment or separated without departing from the scope of the disclosure. For example, although separate functional blocks in FIG. 1 are shown for issuer 90 and merchant 60, some entities perform the functions of both entities and may be included in embodiments of the disclosure. As another example, the methods described in the disclosure can include more, fewer, or other steps. Also, the steps may be performed in any suitable order. Moreover, the operations of components in the illustrated embodiments may be performed by more, fewer, or other components.

All patents, patent applications, publications, and descriptions mentioned above are herein incorporated by reference in their entirety for all purposes. None is admitted to be prior art.

What is claimed is:

1. A server computer comprising:
   a processor; and
   a computer readable medium coupled to the processor, wherein the computer readable medium comprises code executable by the processor, for causing the processor to implement a method comprising
   determining a load value loaded on a portable consumer device in a first currency and
   converting at least a portion of the load value to a second currency using an exchange rate associated with the first currency and the second currency, wherein the exchange rate is associated with a set date selected by a consumer associated with the portable consumer device.

2. The server computer of claim 1, wherein the portable consumer device is a prepaid card.

3. The server computer of claim 1, wherein the computer readable medium further comprises code for receiving the set date from the consumer associated with the portable consumer device.

4. The server computer of claim 1, wherein the computer readable medium further comprises code for determining the set date, wherein the set date is a date on which the exchange rate is equal to or higher than a minimum exchange rate.

5. The server computer of claim 4, wherein the computer readable medium further comprises code for receiving the minimum exchange rate from the consumer associated with the portable consumer device.

6. The server computer of claim 1, wherein the computer readable medium further comprises code for loading the load value on the portable consumer device.

7. The server computer of claim 1, wherein the computer readable medium further comprises code for receiving a transaction amount associated with a transaction conducted using the portable consumer device, wherein the transaction is associated with the first currency.

8. A method comprising:
   determining, by a processor, a load value loaded on a portable consumer device in a first currency; and
   converting, by the processor, at least a portion of the load value to a second currency using an exchange rate associated with the first currency and the second currency, wherein the exchange rate is associated with a set date selected by a consumer associated with the portable consumer device.

9. The method of claim 8, wherein the portable consumer device is a prepaid card.

10. The method of claim 8, further comprising receiving the set date from the consumer associated with the portable consumer device.

11. The method of claim 8, further comprising determining, by the processor, the set date, wherein the set date is a date on which the exchange rate is equal to or higher than a minimum exchange rate.

12. The method of claim 11, further comprising receiving the minimum exchange rate from the consumer associated with the portable consumer device.

13. The method of claim 8, further comprising loading the load value on the portable consumer device.

14. The method of claim 8, receiving a transaction amount associated with a transaction conducted using the portable consumer device, wherein the transaction is associated with the first currency.

15. A method comprising:
   obtaining a loadable portable consumer device; and
   initiating converting by a processor at least a portion of a load value from a first currency to a second currency using an exchange rate, wherein the exchange rate is associated with a set date, wherein the method further comprises selecting the set date by a consumer associated with the loadable portable consumer device.

16. The method of claim 15, wherein the portable consumer device is a prepaid card.

17. The method of claim 15, further comprising selecting a minimum exchange rate, wherein the processor is configured to determine the set date, wherein the set date is a date on which the exchange rate is equal to or higher than a minimum exchange rate.

18. The method of claim 15, wherein the set date is after a date that the loadable portable consumer device is obtained.

19. The method of claim 1 wherein selecting the set date by the consumer comprises selecting the set date using a Web site.

20. The method of claim 8 further comprising:
   receiving an authorization request message including a PAN and a transaction amount in the second currency on a transaction date subsequent to the set date;
   converting the transaction amount to the first currency using the exchange rate to form a converted transaction amount in the first currency; and
   sending a modified authorization request message comprising the converted transaction amount in the first currency to an issuer of the portable consumer device for approval.

* * * * *